UNITED STATES PATENT OFFICE.

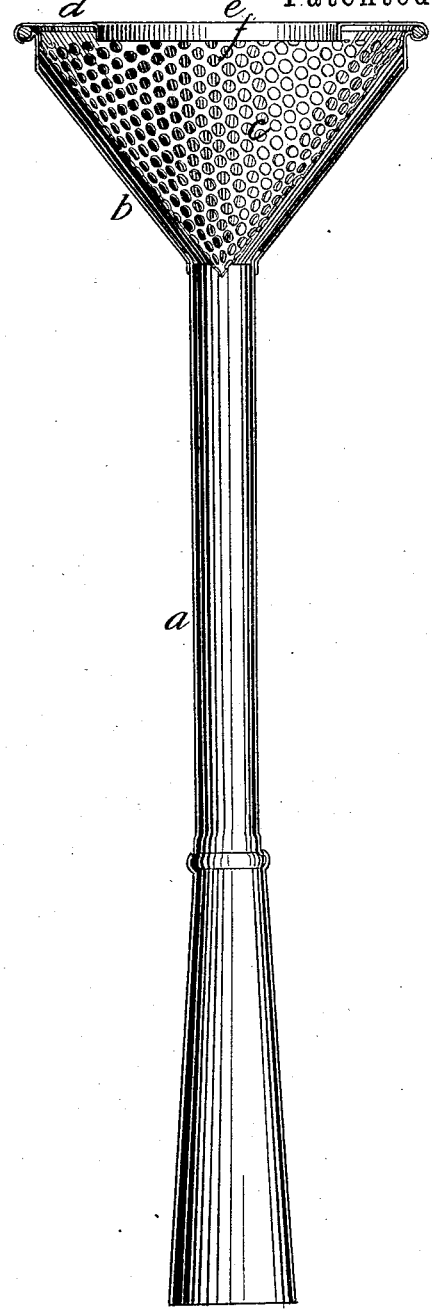

MARY STEWART WOODWARD, OF CHICAGO, ILLINOIS.

INHALER.

SPECIFICATION forming part of Letters Patent No. 484,944, dated October 25, 1892.

Application filed July 18, 1892. Serial No. 440,416. (No model.)

*To all whom it may concern:*

Be it known that I, MARY STEWART WOODWARD, a citizen of the United States, residing at Chicago, in the county of Cook and State of Illinois, have invented a new and useful Inhaler, of which the following is a specification.

My invention relates to improvements in inhalers operated by steam and hot air; and the object of my improvement is to provide a means of vaporizing the properties contained in herbs by using them in a natural state or vaporizing volatile oils and liquids by placing them upon suitable substances and forcing heat through them. I attain these objects by the device illustrated in the accompanying drawing, which shows the same partly in section and partly in elevation, and in which—

$a$ represents a pipe, the bottom of larger diameter than the top in order to slip over the ends of steam and hot-air pipes and make a close joint.

$b$ represents the outer casing, forming a chamber conical in form, to which pipe $a$ is attached.

$c$ represents a perforated cone or diaphragm connected at its base with outer casing $b$, so arranged that a space is left between them for steam or hot air to circulate.

$d$ represents a circular cover connected at its edge with said diaphragm and outer casing. It has a circular opening in its center with a rim turned inward, projecting into said chamber, to aid in retaining the heat.

To operate my invention, the diverging end of pipe $a$ is slipped over the end of a pipe conveying steam or hot air. The space inside the conical diaphragm $c$ is filled with herbs through opening $e$ as high as rim $f$. In case a sponge, asbestus, or other substance is used, it is filled in the same manner and the volatile oils or liquids placed thereon. Heat being applied through pipe $a$, it circulates freely in the space between diaphragm $c$ and the outer casing $b$ and is forced through the perforations and substances containing the medicaments and escapes through opening $e$ in the form of a vapor.

Having fully described my invention, what I claim, and desire to secure by Letters Patent, is—

In an inhaler, the combination of flaring pipe $a$ with conical chamber $b$, divided by perforated diaphragm $c$, with circular cover $d$, provided with central opening $e$ and rim $f$, turned inward around its edge, substantially as set forth.

MARY STEWART WOODWARD.

Witnesses:
THOMAS HARRIS,
CHARLES HARRIS.